United States Patent
Min

[11] Patent Number: 5,812,222
[45] Date of Patent: Sep. 22, 1998

[54] BI-DIRECTION LIQUID CRYSTAL PROJECTION TELEVISION SET

[75] Inventor: Jong-sul Min, Suwon, Rep. of Korea

[73] Assignee: Samsung Electronics Co., Ltd., Kyungki-do, Rep. of Korea

[21] Appl. No.: 665,094

[22] Filed: Jun. 14, 1996

[30] Foreign Application Priority Data

Jun. 16, 1995 [KR] Rep. of Korea ................. 95-16556

[51] Int. Cl.$^6$ ................................................. H04N 9/31
[52] U.S. Cl. .................. 348/744; 348/750; 348/751; 348/840
[58] Field of Search .................... 348/744, 751, 348/756, 758, 759, 760, 761, 766, 775, 786, 781, 791; H04N 9/31

[56] References Cited

U.S. PATENT DOCUMENTS 5,477,280  12/1995  Ko ............................................. 348/744
5,526,063   6/1996  Joubert et al. ........................... 348/761

FOREIGN PATENT DOCUMENTS 186521  8/1994  Japan ................................. H04N 9/31

*Primary Examiner*—Glenton B. Burgess
*Attorney, Agent, or Firm*—Sughrue, Mion, Zinn, Macpeak & Seas, PLLC

[57] ABSTRACT

A rear-type liquid crystal projection television set according to the present invention comprises a dichroic mirror which receives color light to which electrical video signal is applied, reflects and transmits the received color light through cells having a light reflection characteristic and cells having a light transmission characteristic, a first screen for receiving the color light reflected by the dichroic mirror means and displaying the received color light as an image, and a second screen for receiving the color light transmitted by the dichroic mirror means and displaying the received color light as an image. A dichroic mirror consisted of cells includes the reflection and transmission of the same color light, and thereby to allow viewers to view the same image of the television set in different directions.

5 Claims, 6 Drawing Sheets

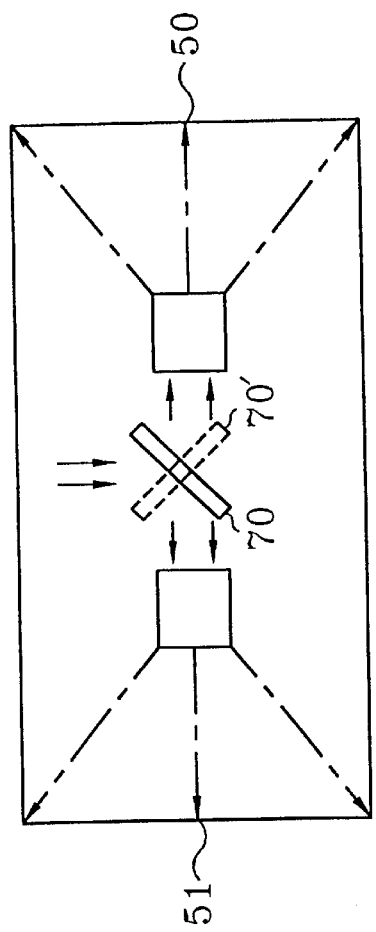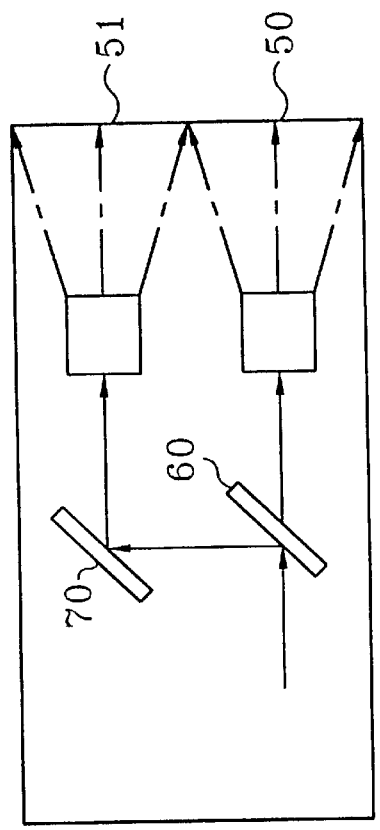

BI-DIRECTION LIQUID CRYSTAL PROJECTION TELEVISION SET

BACKGROUND OF THE INVENTION

The present invention relates to a projection television set, and particularly to a bi-direction projection television set in which a user can simultaneously view a projection television set in different directions.

Rear type projection television sets which project video signals onto a screen, have been generally used in public performance stages, meeting halls, and the like, since rear type projection television sets have a large screen compared with a television set with a cathode-ray tube. Such a projection television set is classified into one of a single liquid crystal panel television set and a three liquid crystal panel television set according to the number of liquid crystal panels which generate a color signal.

One example of a rear type projection television set using one liquid crystal panel is illustrated in FIG. 1. A light source 10 emits white light and a filter 20 eliminates ultraviolet rays and infrared rays from the white light emitted from light source 10. A liquid crystal panel 30 applies an electrical video signal to a visible ray passed through filter 20, and the color light to which the electrical video signal is applied is displayed as an image onto a screen 50 by a projection lens 40 in a known manner.

FIG. 2 shows rear type projection television set using three liquid crystal panels. Filter 20 transmits only the visible wavelengths of the white light emitted from light source 10 to a dichroic mirror 61. Red light is reflected and green and blue light is transmitted by the dichroic mirror 61. A dichroic mirror 62 reflects the green light and transmits the blue light from first dichroic mirror 61. A liquid crystal panel 32 applies an electrical green video signal and to the green light reflected from dichroic mirror 62. A liquid crystal panel 33 applies an electrical blue video signal to the blue light which is transmitted by the dichroic mirror 62. A reflection mirror 71 reflects the blue light from liquid crystal panel 33, and a reflection mirror 72 reflects the red light reflected by the dichroic mirror 61. Liquid crystal panel 31 applies an electrical red video signal to the red light reflected from reflection mirror 72. A dichroic mirror 63 transmits the red light from liquid crystal panel 31, and reflects the green light from liquid crystal 32. The red and green light from third dichroic mirror 63 is transmitted via a dichroic mirror 64, and the blue light from reflection mirror 71 is reflected from dichroic mirror 64. A projection lens 40 displays the red, green and blue light of dichroic mirror 64 onto a screen (not shown) as an image.

The above conventional rear type liquid crystal projection television set displays an image on a single screen, irrespective of whether it uses one liquid crystal panel or three liquid crystal panels. Thus, when it is required to simultaneously provide the same image in several directions, such as public places, respective screens, directed in every direction, may be installed. Accordingly, costs for installing television sets to provide the same image are high, and it is difficult to install the plurality of television sets in narrow spaces.

SUMMARY OF THE INVENTION

Therefore, in order to solve the above problems, it is an object of the present invention to provide a single projection television set, in which a user can view the same image from different directions.

To accomplish the above object of the present invention, there is provided a rear-type liquid crystal projection television set, comprising a means for light-separating white light projected from a light source into color light, and a liquid crystal panel for applying an electrical video signal to the color light obtained through the light separation, the liquid crystal projection television set comprising:

dichroic mirror means which receives the color light to which the electrical video signal is applied, reflects and transmits the received color light through cells having a light reflection characteristic and cells having a light transmission characteristic; a first screen means for receiving the color light reflected by the dichroic mirror means and displaying the received color light as an image; and a second screen means for receiving the color light transmitted by the dichroic mirror means and displaying the received color light as an image.

BRIEF DESCRIPTION OF THE DRAWINGS

The preferred embodiments are described with reference to the drawings wherein:

FIG. 6A and 6B illustrate directions that images are displayed by the television sets of FIG. 4 or FIG. 5.

DETAILED DESCRIPTION OF THE PREFERRED EMBODIMENT

A preferred embodiment of the present invention will be described below in more detail with reference to the accompanying drawings.

Figure 3:
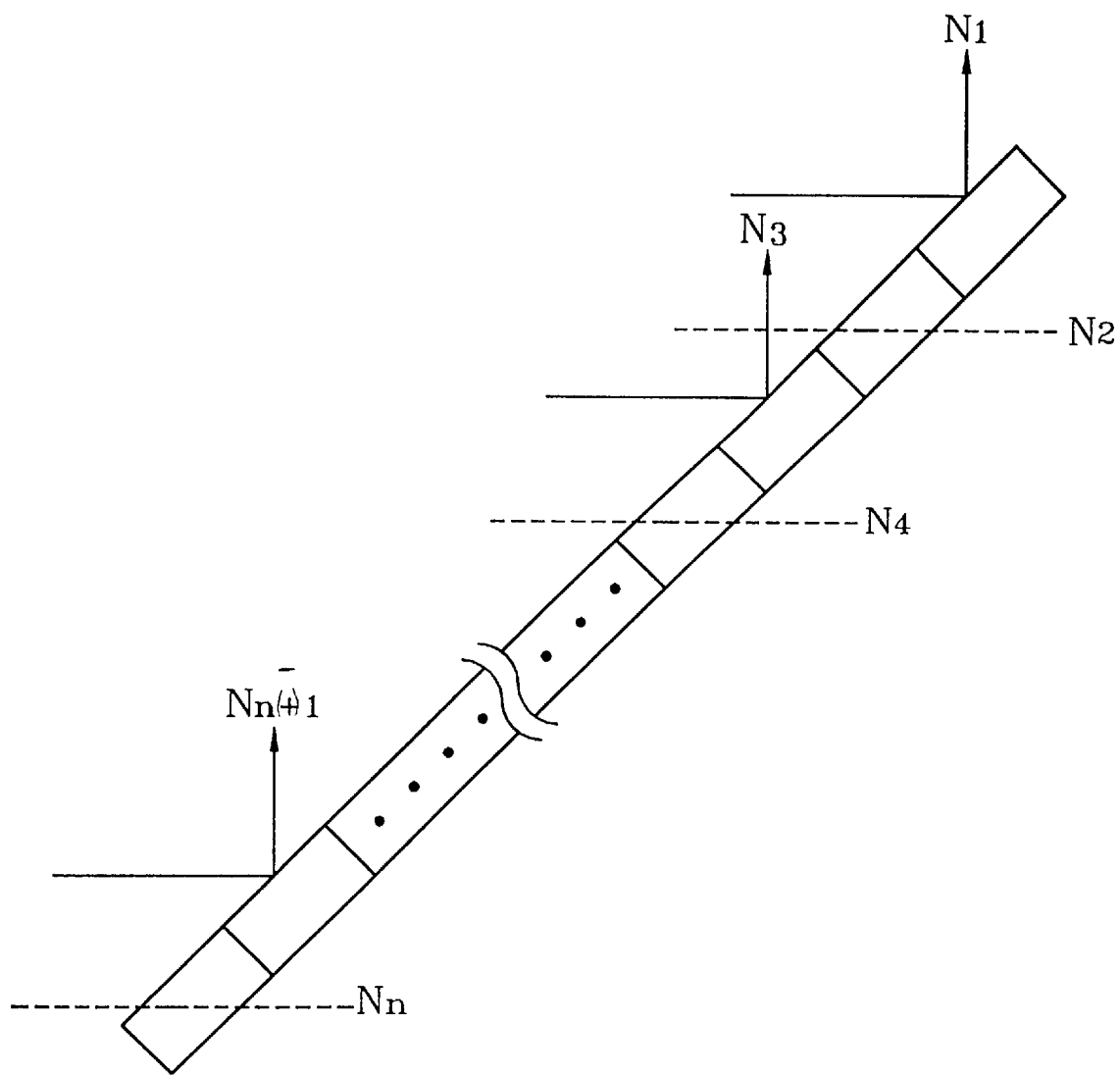
FIG. 3 is a conceptual view for explaining a dichroic mirror according to the preferred embodiment of the present invention.

The present invention was based on the fact that the same light is transmitted in two directions by reflecting or transmitting incident light. Technology referring to transmition of a part of color light and reflection of the other part is disclosed in U.S. Pat. No 5,447,280 which issued on Dec. 19, 1995. This document refers to a dichroic mirror which does not fully reflect or completely transmit incident light with respect to a transmission band or a reflection band according to an actual light transmission characteristic. The dichroic mirror of the preferred embodiment, unlike that of the document, comprises a plurality of cells each having the ability to transmit light and to reflect light. Such a dichroic mirror of the present invention is shown one-dimensionally in FIG. 3. Cells $N_1, N_2, \ldots, N_n$ shown in FIG. 3 are disposed so that every other cell reflects light and every other alternate cell transmits. Therefore, in the dichroic mirror of FIG. 3, cells having a light transmission characteristic and those having a light reflection characteristic with respect to the entire surface to which light is incident, are substantially uniformly distributed. An embodiment of the rear type projection television set which has one liquid crystal panel and the dichroic mirror of FIG. 3 is shown in FIG. 4.

Figure 1:
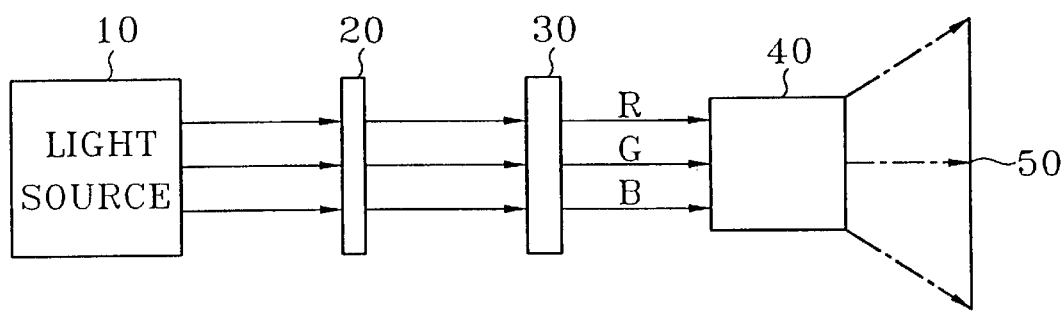
FIG. 1 illustrates a conventional projection television set having a single liquid crystal panel.
Figure 4:
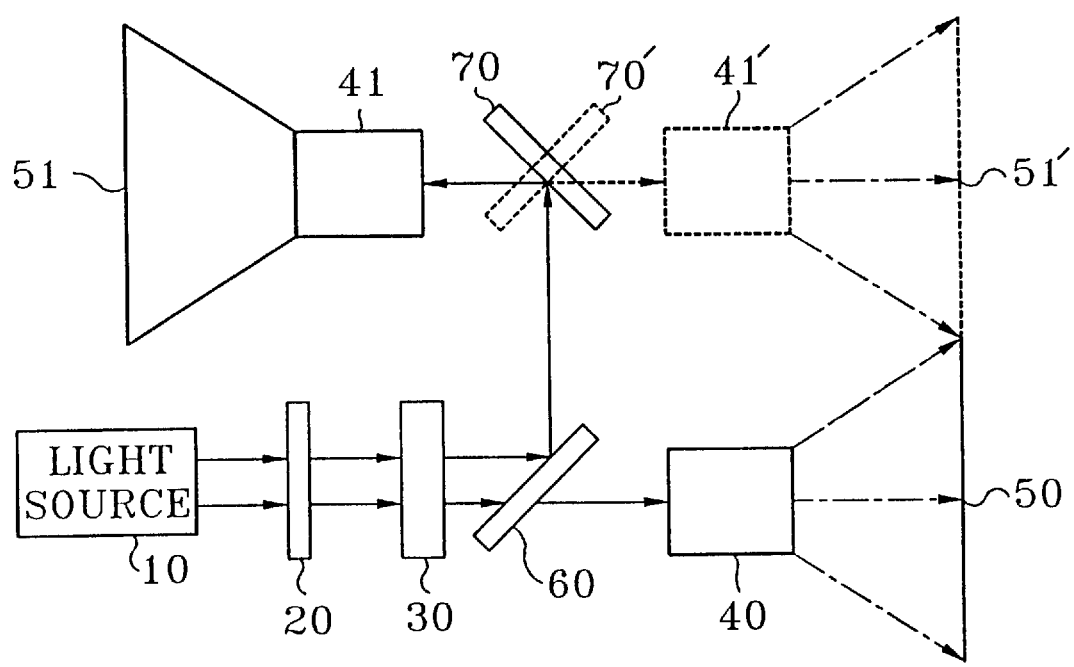
FIG. 4 and FIG. 5 are views showing liquid crystal projection television sets of a one panel type and a three panel type with the dichroic mirror of FIG. 3, respectively.

Referring to FIG. 4, elements having the same reference numeral as in FIG. 1 perform the same function with respect to the corresponding element of FIG. 1, and thus specific description thereof will be omitted. A dichroic mirror 60 which is the mirror in accordance with the present invention and described with reference to FIG. 3, transmits a part of all wavelengths of the light to which an electrical video signal is applied to a one projection lens 40, and the other part of the light reflected is to a reflection mirror 70. Projection lens 40 displays the color light supplied from dichroic mirror 60 as an image on a screen 50. Reflection mirror 70 transmits the color light from dichroic mirror 60 to a projection lens 41 which displays the color light as an image on a screen 51. Thus, the projection television set of FIG. 4, as shown in FIG. 6A, displays an image so that viewers may at the same time view the same image from both opposing directions. Reflection mirror 70 reflecting a light video signal to the left of FIG. 4 can be replaced with a reflection mirror 70' reflecting a light video signal to the right. In this case, projection lens 41' is to project the received light video signal into the same direction as that of projection lens 40. Thus, the television set of FIG. 4, as shown in FIG. 6B, allows viewers to view the same image via two screens (see FIG.6B).

Figure 2:
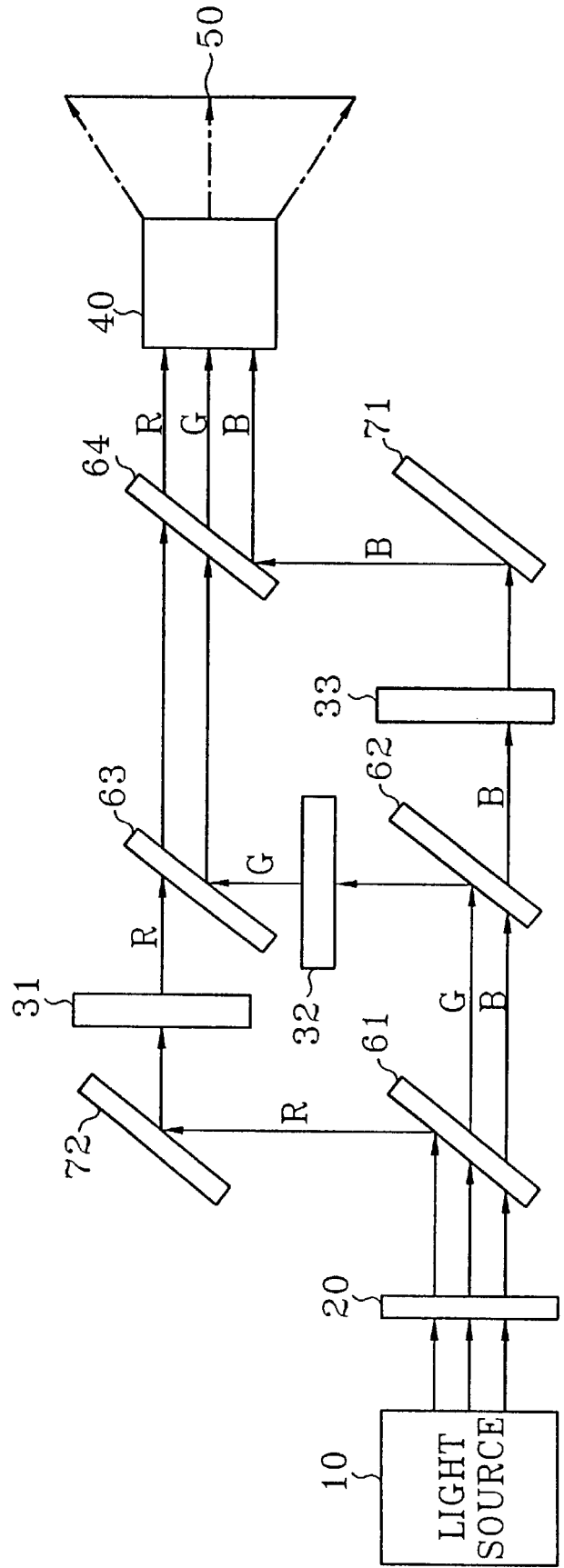
FIG. 2 illustrates a conventional projection television set having three liquid crystal panels.
Figure 5:
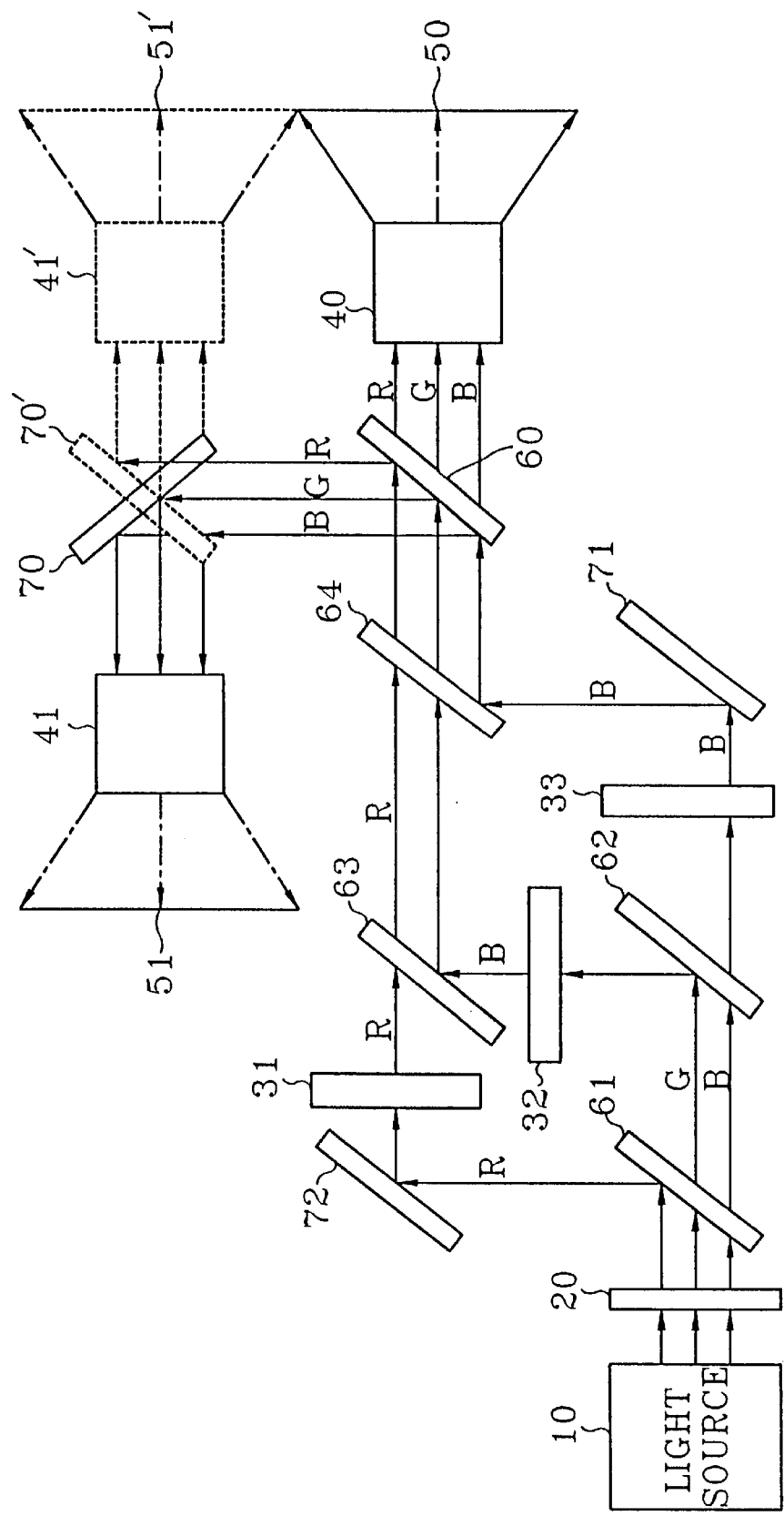

FIG. 5 shows an embodiment using the dichroic mirror 60 in a projection television set having three liquid crystal panels. In FIG. 5, elements having the same reference numerals as in FIG. 2 perform the same function with respect to the corresponding element of FIG. 2, and thus specific description thereof will be omitted. Referring to FIG. 5, a dichroic mirror 60 reflects and transmits all wavelengths of the color light incident from a fourth dichroic mirror 64 according to the characteristics discussed with reference to FIG. 3. The color light which passes through dichroic mirror 60 is displayed on a screen 50 as an image via projection lens 40, and the color light reflected by dichroic mirror 60 is transmitted to a reflection mirror 70. Reflection mirror 70 reflects the color light to be incident, and the reflected color light is displayed on screen 51 as an image by projection lens 41. Accordingly, the liquid crystal projection television set of FIG. 5 can also provide the same image into two different directions as the television set of FIG. 4. Reflection mirror 70 can be replaced with reflection mirror 70' transmitting the color light to the right of FIG. 5. In this case, projection lens 41' projects the received light video signal into the same direction as that of projection lens 40.

As described above, the television set of the present invention separates all wavelengths of color light into different directions, using the dichroic mirror having a light transmission characteristic and a light reflection characteristics, and thus provides the same image in different directions. Accordingly, the present invention reduces the costs for installation of a television set and it is suitable for use in narrow spaces.

While only certain embodiments of the invention have been specifically described herein, it will apparent that numerous modifications may be made thereto without departing from the spirit and scope of the invention.

What is claimed is:

1. A rear-type liquid crystal projection television set, comprising means for separating white light projected from a light source into light components of different colors, and a liquid crystal panel corresponding to each light component for applying an electrical video signal thereto, said liquid crystal projection television set further comprising:

dichroic mirror means which receives each of the color light components to which an electrical video signal has been applied, and reflects and transmits the received color light components with their associated electrical video signals, said dichroic mirror means comprising cells having a light reflection characteristic and cells having a light transmission characteristic;

first screen means for receiving all the color light components reflected by said dichroic mirror means and displaying the received color light components as an image; and second screen means for receiving all the color light components transmitted by said dichroic mirror means and displaying the received color light components as an image.

2. The rear-type liquid crystal projection television set according to claim 1, wherein, in the dichroic mirror means, the cells having a reflection characteristic and the cells having a transmission characteristic are substantially uniformly distributed on a surface on which the color light is received.

3. The rear-type liquid crystal projection television set according to claim 1, wherein said first screen means and said second screen means are directed in different directions with respect to each other.

4. The rear-type liquid crystal projection television set according to claim 1, wherein said cells having a light reflection characteristic and said cells having a light transmission characteristic alternate along the length of said dichroic mirror means.

5. A rear-type liquid crystal projection television set, comprising means for separating white light projected from a light source into light of different colors, and a liquid crystal panel for applying an image to the light of different colors, said liquid crystal projection television set further comprising:

dichroic mirror means which receives the color light to which the electrical video signal is applied, and reflects and transmits the received color light, said dichroic mirror means comprising cells having a light reflection characteristic and cells having a light transmission characteristic, wherein the cells having a reflection characteristic and the cells having a transmission characteristic are substantially uniformly distributed on a surface of said dichroic mirror means on which the color light is received;

first screen means for receiving the color light reflected by said dichroic mirror means and displaying the received color light as an image; and second screen means for receiving the color light transmitted by said dichroic mirror means and displaying the received color light as an image.

\* \* \* \* \*